July 22, 1958  B. COWART  2,843,972
FLORAL DESIGN RACK
Filed June 19, 1956
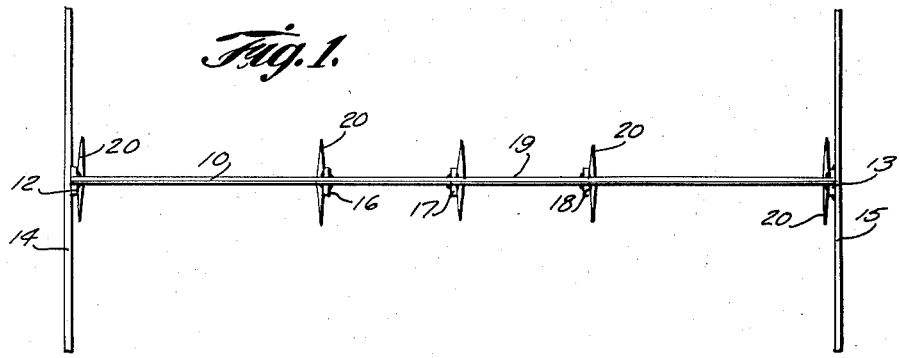
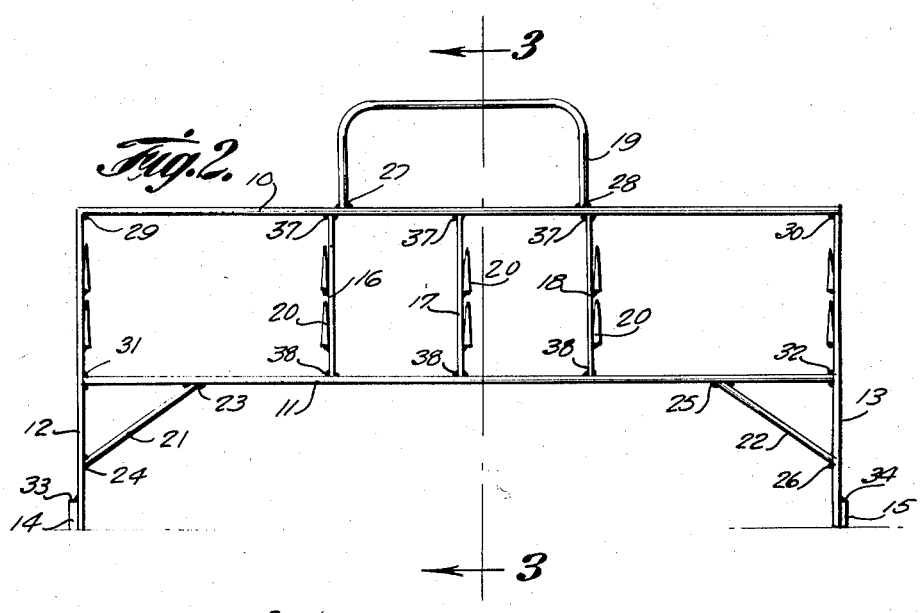
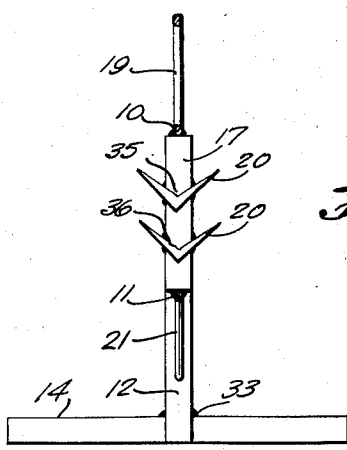
INVENTOR.
*Burleigh Cowart*
BY *Victor J. Evans & Co.*
ATTORNEYS

United States Patent Office 2,843,972
Patented July 22, 1958

2,843,972

FLORAL DESIGN RACK

Burleigh Cowart, Pascagoula, Miss.

Application June 19, 1956, Serial No. 592,362

2 Claims. (Cl. 47—41)

This invention relates to florists' supplies and particularly devices for carrying a plurality of sprays of flowers from a shop to a truck and also from a truck to a funeral parlor or the like, and in particular a rack including a vertically disposed frame with cross bars at the ends for retaining the rack in an upwardly extended position, a handle on the upper side by which the rack is carried, and vertically disposed bars with points extended from opposite sides whereby sprays of flowers positioned on the points are adapted to be carried from a shop to a delivery truck and from the truck to a funeral parlor making it possible to carry a plurality of sprays in each hand and with the sprays in spaced relation.

The purpose of this invention is to facilitate carrying sprays of flowers from one point to another where, in particular cases it is necessary to carry one spray at a time to prevent damaging the flowers.

In the usual practice of preparing flowers in sprays and other designs the individual flowers are worked up on a foundation of styrofoam, spagmum moss, or the like and as the individual blooms are readily broken it is necessary to keep the sprays and other designs separated and it is substantially impossible to place one spray upon another. With this thought in mind this invention contemplates a vertically positioned rack having points extended from opposite sides whereby sprays positioned on the points are retained in upright positions and in spaced relation making it possible to carry a plurality of sprays in each hand and consequently reducing the number of trips from the shop to the truck and from the truck to the funeral parlor.

The object of this invention is, therefore, to provide a rack for floral designs wherein the designs are independently supported and wherein the sprays or other designs are retained in spaced relation.

Another object of the invention is to provide a rack for floral designs in which the designs are positioned on the rack as they are worked up and also in which the designs remain on the rack as they are carried to a truck, delivered by the truck, and carried from the truck to a funeral parlor.

A further object of the invention is to provide a floral design rack in which the rack is of a simple and economical construction.

With these and other objects and advantages in view the invention embodies a rack having vertically spaced horizontally disposed bars positioned with the ends carried by posts extended from cross bars and retained in spaced relation with intermediate vertically disposed bars, the vertically disposed bars in the intermediate portion and ends of the frame having points extended angularly upwardly from both sides thereof and the uppermost of the parallel bars having a handle extended upwardly therefrom.

Other features and advantages of the invention will appear from the following description taken in connection with the drawing, wherein:

Figure 1 is a plan view of the improved floral design rack.

Figure 2 is a side elevational view of the rack.

Figure 3 is a cross section through the rack taken on line 3—3 of Fig. 2.

Referring now to the drawing wherein like reference characters denote corresponding parts the improved floral design rack of this invention includes spaced parallel bars 10 and 11, posts 12 and 13 to which ends of the bars 10 and 11 are connected and which are supported by cross bars 14 and 15, intermediate vertically disposed rods 16, 17 and 18 extended between the bars 10 and 11, a U-shaped handle 19 extended from the upper bar 10 and points 20 extended from opposite sides of the vertically disposed rods and posts and positioned at substantially 45 degrees to said rods and posts.

The frame is provided with diagonally positioned bracing bars 21 and 22, the bar 21 being connected to the bar 11 at the point 23 and to the post 12 at the point 24 and the bar 22 being connected to the bar 11 at the point 25 and to the post 13 at the point 26.

As illustrated in the drawing the ends of the bars and rods are connected by welding or the like, although it will be understood that the bars may be connected by suitable means.

The lower ends of the upright members of the handle 19 are similarly connected to the upper bar 10 at the points 27 and 28 and the ends of the bar 10 are connected to the posts 12 and 13 at the points 29 and 30. The ends of the lower bar 11 are connected to the posts 12 and 13 at the points 31 and 32 and the lower ends of the posts are secured to the cross bars 14 and 15, such as by welding, as shown at the points 33 and 34.

The points 20 which are provided with angularly shaped members are also secured to the rods and posts, such as by welding, as shown at the points 35 and 36, in Fig. 3. The upper and lower ends of the intermediate rods 16, 17 and 18 are also connected to the bars 10 and 11 by welding, as indicated at the points 37 and 38.

With the parts assembled as illustrated and described the racks are set up in upright positions in the shop of the florist and as the sprays are worked up they are positioned upon the points whereby the individual sprays are supported in upright positions and in spaced relation and with each spray held by two points the rack may be carried with the sprays thereon with safety with the assurance that the sprays will not drop.

It will be understood that modifications, within the scope of the appended claims, may be made in the design and arrangement of the parts without departing from the spirit of the invention.

What is claimed is:

1. In a floral design rack, the combination which comprises a pair of vertically spaced horizontally disposed bars, posts extended downwardly from the bars and to which ends of the bars are connected, cross bars to which lower ends of the posts are connected, said cross bars retaining the posts in upright positions, spaced vertically disposed rods extended between the bars, angularly shaped members secured to said rods and posts in vertical spaced relation to each other and having upwardly disposed points extended from both sides of the rods and posts, and a handle extended upwardly from said rack.

2. In a floral design rack, the combination which comprises a pair of vertically spaced horizontally disposed bars, posts extended downwardly from the bars and to which ends of the bars are connected, cross bars to which lower ends of the posts are connected, said cross bars retaining the posts in upright positions, three spaced vertically disposed rods extended between the horizontally disposed bars centrally thereof, angularly shaped members secured to said rods and posts in vertical spaced relation to each other and having upwardly disposed points extended from both sides of the rods and posts, diagonally positioned braces connected to the posts and to one of the horizontally disposed bars for supporting the parts in upright positions, and an inverted U-shaped handle extended upwardly from the uppermost of said horizontally disposed bars in alinement with the outermost vertically disposed bars.

References Cited in the file of this patent

UNITED STATES PATENTS

| | | |
|---|---|---|
| Re. 17,487 | Heinz | Nov. 12, 1929 |
| 1,828,249 | Hammond | Oct. 20, 1931 |
| 2,119,237 | Mendel | May 31, 1938 |
| 2,289,729 | Robinson et al. | July 14, 1942 |
| 2,707,379 | Guior | May 3, 1955 |

FOREIGN PATENTS

| | | |
|---|---|---|
| 345,706 | Great Britain | Apr. 2, 1931 |